United States Patent [19]
Paddington

[11] 3,865,409
[45] Feb. 11, 1975

[54] PIPE COUPLINGS

[75] Inventor: Arthur Loftus Paddington, Shinfnal, England

[73] Assignee: British Ropes Limited, Doncaster, Yorkshire, England

[22] Filed: Feb. 20, 1973

[21] Appl. No.: 333,737

[30] Foreign Application Priority Data
Mar. 7, 1972 Great Britain.................. 10507/72
Aug. 24, 1972 Great Britain.................. 39480/72

[52] U.S. Cl.................... 285/18, 285/47, 285/320, 285/364, 285/420
[51] Int. Cl............................................ F16l 23/00
[58] Field of Search ........ 285/320, 18, DIG. 21, 47, 285/25, 24, 420

[56] References Cited
UNITED STATES PATENTS

| | | | |
|---|---|---|---|
| 1,889,133 | 11/1932 | Pfefferle | 285/320 |
| 3,473,830 | 10/1969 | Haley | 285/320 |
| 3,489,434 | 1/1970 | Haley | 285/320 |
| 3,586,350 | 6/1971 | Ashton | 285/320 |
| 3,615,107 | 10/1971 | Paddington | 285/320 |
| 3,645,564 | 2/1972 | Corriston | 285/47 |
| 3,661,408 | 5/1972 | Gibbons | 285/18 |

Primary Examiner—Werner H. Schroeder
Attorney, Agent, or Firm—Morgan, Finnegan, Durham & Pine

[57] ABSTRACT

A clamping assembly for a pipe coupling, which in use, is arranged to be movable both axially and radially of the coupling for releasably engaging and clamping a flange of a pipe to the coupling. The clamping assembly includes a clamping arm movable under control of fluid actuated ram means with cam means interposed therebetween. The arrangement is such that when the ram means is actuated to clamp the flange, movement of the ram means is initially directly transmitted to the clamping arm and further movement of the ram means is transmitted to the clamping arm via the cam means such as to reduce the movement of and increase the available pressure to the clamping arm. The assembly is suitable for use on loading arms for tank vessels.

18 Claims, 7 Drawing Figures

PIPE COUPLINGS

The invention relates to pipe couplings and more particularly, although not exclusively, to pipe couplings suitable for use on a marine loading arm for loading and unloading tank vessels.

According to one aspect of the invention there is provided a clamping assembly for a pipe coupling, which, in use is arranged to be movable both axially and radially of the coupling for releasably engaging and clamping a flange of a pipe to the coupling, the clamping assembly including a clamping arm movable under control of fluid actuated ram means with cam means interposed therebetween, the arrangement being such that when the ram means is actuated to clamp said flange movement of the ram means is initially directly transmitted to the clamping arm and further movement of the ram means is transmitted to the clamping arm via the cam means such as to reduce the movement of and increase the available pressure to the clamping arm.

The clamping arm of the clamping assembly may be pivotally mounted to a mounting member which is in turn pivotally mounted to a support member, which support member pivotally mounts the fluid actuated ram, linkage means being provided between the clamping arm and the mounting member to control said radial movement of the clamping arm.

Said linkage means may include a first link which is pivotally mounted at one end to said mounting member and is fixedly locatable, at its other end, at any one of a plurality of positions on said mounting member, whereby the radial starting position of the clamping arm is adjustable. The fluid actuated ram is preferably longer than required to achieve desired operation with said first link in any of its positions so that satisfactory operation can be achieved in all positions.

Said linkage means may comprise second and third links, the second link being pivotally mounted at one end to a point between the ends of the first link and pivotally mounted at its other end to one end of the third link, the other end of the third link being pivotally mounted to the clamping arm at a point between its pivotal mounting to the mounting member and its clamping end, and the pivotal mounting between the second and third links comprising a spindle which depends into a guide slot formed in the support member to control said radial movement of the clamping arm.

The clamping arm, mounting member, support member, first and second links may all comprise pairs of members symmetrically arranged one on each side of the fluid actuated ram, cam means and third link.

The cam means may comprise a bell crank lever pivotally mounted between the clamping arms, with the crank pivotally mounted to be actuated by the fluid actuated ram means and being formed with an arcuate camming surface at the end of its arm, which camming surface is arranged to abut a nose portion of a member which is located to and spans the mounting members. Said arcuate camming surface may be serrated. The camming means may be so formed and so mounted that there is provided an action of said arcuate camming surface with a cam angle of less than 10°.

The fluid actuated ram means may include a fluid actuated check valve.

Further cam means may be provided which is engageable with said cam means to lock said cam means in any position thereof during actuation of the assembly to clamp the flange of a pipe to the coupling should a failure of said ram means occur.

Further fluid actuated ram means may be provided for controlling movement of the clamping arm radially of the coupling, said further ram means being arranged to be actuated prior to said ram means when controlling the clamping arm to clamp the flange of a pipe to the coupling.

Said ram means and said further ram means may be arranged to be actuated simultaneously for release of the clamping arm, said further ram means being arranged to release the further cam means from locking engagement with said cam means.

A pipe coupling may comprise three or more clamping assemblies. The clamping assemblies may be mounted on a tubular outer member which surrounds and is spaced apart from an inner tubular member providing the liquid passage of the coupling and a heat insulating medium being provided in the space between said tubular members.

The outer tubular member may be rigidly attached to the inner tubular member at its end adjacent the flange engaging end of the coupling and radially supported but axially free for expansion and contraction at its other end.

The radial support for said other end of the outer tubular member may comprise an annular member which spans the space between the tubular members. The annular member may comprise polytetrafluoroethylene.

The heat insulating medium may comprise expanded polystyrene.

The foregoing and further features of the invention may be more readily understood from the following description of two preferred embodiments thereof, by way of example, with reference to the accompanying drawings, in which.

Figure 1:
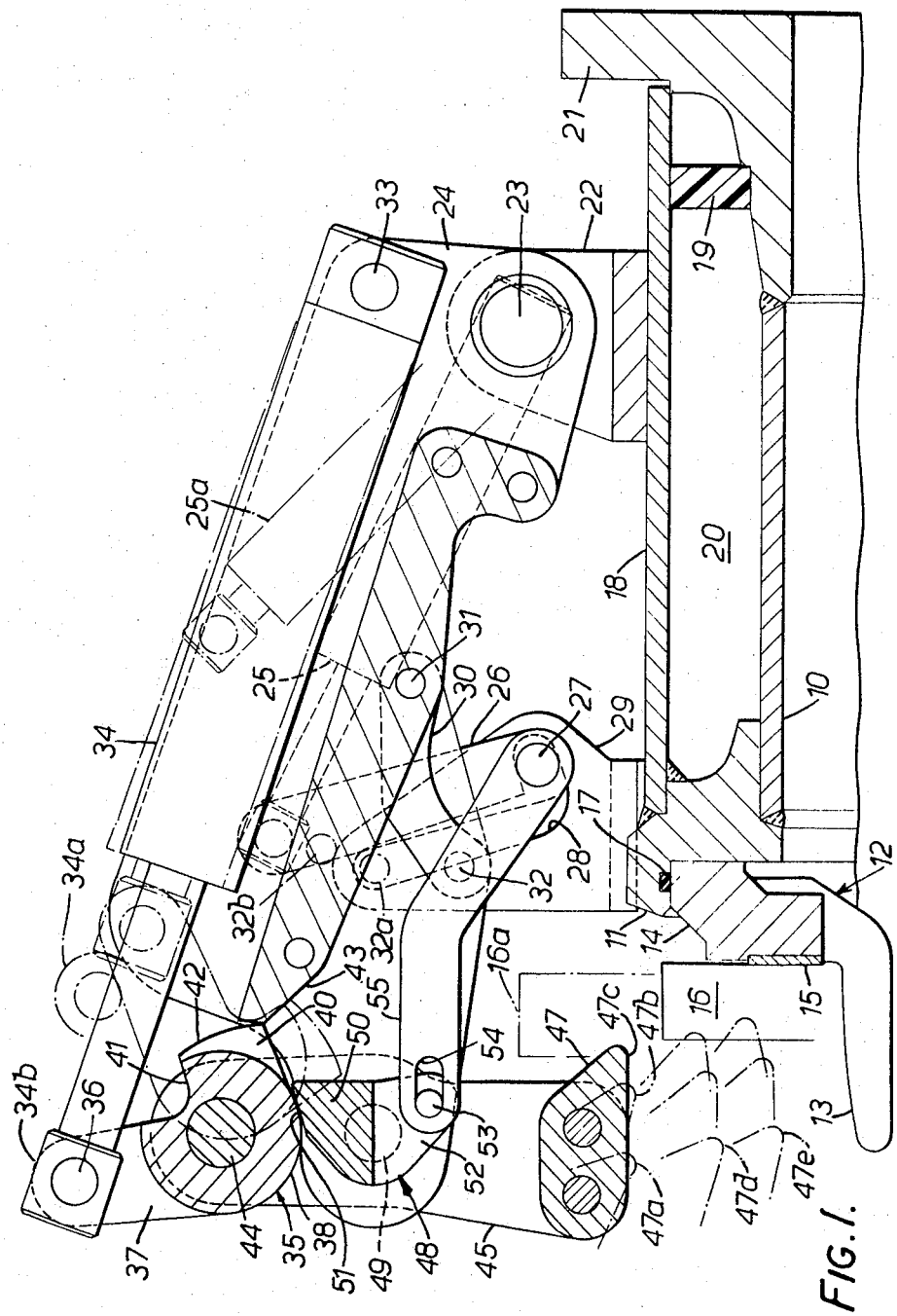
FIG. 1 is a side sectional view of a pipe coupling.
Figure 2:
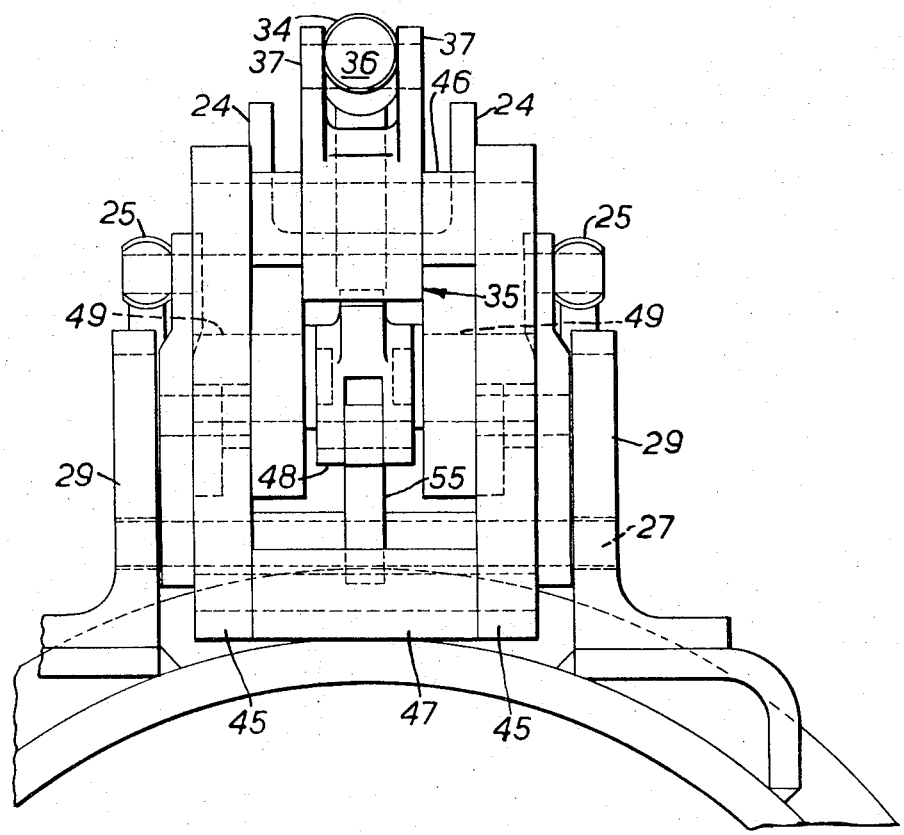
FIG. 2 is an end elevational view of the pipe coupling of FIG. 1.

Referring now to FIGS. 1 and 2 of the drawings, there is shown a pipe coupling which is suitable for use on a marine loading arm for loading and unloading tank vessels. The pipe coupling illustrated is particularly suitable for the loading and unloading of cryogenic liquids such as liquified natural gas.

Referring firstly to FIG. 1 the coupling comprises an inner tubular member 10 which provides a passage for liquid through the coupling. An annular flange member 11 is welded to the outer end of member 10 and provides a housing for a replaceable adaptor plate 12, the size of which depends on the size of the pipe to which the coupling is to be clamped. The adaptor plate 12 includes a plurality of axially extending fingers 13 to assist in locating the coupling with the pipe. The adaptor plate 12 also carries an annular seal member 14 which includes a radially extending seal surface portion 15 against which the flange, diagrammatically shown at 16, of the pipe is abutted to form a primary seal. A further annular seal 17 is located at the outer periphery of member 14 to provide a secondary seal. The action of the flange 16 being forced axially against sealing surface 15 causes pressure to be exerted radially of the member 14 to enhance the secondary seal 17.

An outer tubular member 18 is welded at one end to the annular flange member 11 and is supported at its other end by an annular member 19, of polytetrafluoroethylene, which spans the space 20 between tubular member 10 and tubular member 18. The other end of tubular member 18 is further supported by resting on a stepped portion of a flange 21 attached to the tubular member 10. The remainder of the space between tubular members 10 and 18 is filled with a heat insulating material, such as expanded polystyrene. The outer tubular member 18 serves as a support for the actuating mechanism of the coupling and it will be seen that this member 18 is to a large extent insulated from the liquid carrying passage of member 10 and is free to expand and contract axially with changes of temperature due to the liquid passing through the passage of member 10.

Referring again to FIGS. 1 and 2 the actuating mechanism of the coupling comprises a pair of brackets 22 carried on member 18 with a shaft 23 spanning the brackets 22. Pivotally mounted on shaft 23 are a pair of main support plates 24 and a pair of hydraulically actuated rams 25. The free end of the piston of each ram 25 is pivotally connected to one end of a link 26. The other ends of link 26 are spanned by a shaft or roller 27 which extends through L-shaped guide slots 28 in a pair of plates 29 carried on member 11. The links 26 are also pivotally connected to respective links 30 carried on main support plates 24. One end of each of links 30 is pivotally connected at point 31 on its plate 24 whilst the other end is bolted to its plate 29 at point 32. For adjustment of radial movement of plates 24 to accommodate connections to different size pipes said other ends of links 30 can be bolted alternatively at points 32a or 32b on plates 24.

For moving plates 24 from their open or unclamped position to the clamped position as shown in FIG. 1 the rams 25 have their pistons moved from the retracted position as shown at 25a to the fully extended position. Such movement of the pistons of rams 25 in being extended cause the shaft 27 to be moved down slot 28 so moving the links 26 radially inwardly with respect to member 10. This movement of links 26 is transmitted to links 30 and hence to main support plates 24 which carry links 30.

Mounted between support plates 24 on a shaft 33 is a further hydraulically actuated ram 34. The free end of the piston of ram 34 pivotally carries a cam 35 by means of a shaft or pin 36. The cam 35 comprises two arms 37 which extend one on each side of the piston of ram 34 to accommodate shaft 36. The centre portion of cam 35 is radiused at 38 about point 39 and is formed with two nose portions 40, each of which are formed with camming surfaces 41 and 42. The camming surfaces 41 and 42 are abutted by a member 43 which is rigidly located to and spans main support plates 24.

A shaft 44 extends through cam 35 to pivotally carry at one end thereof a support plate 45, one on each end of shaft 44 and spaced from cam 35 by spacers 46 (FIG. 2). The other ends of plates 45 support a clamping member 47, which spans such plates 45, and is the portion of the clamping assembly which acts on the flange 16a of the pipe to be clamped to the coupling.

A further locking cam 48 is pivotally carried between half shafts 49 between the main support plates 24. The locking cam 48 is formed with a nose portion 50 having a camming surface 51 which abuts the surface 38 of cam 35. The locking cam 48 is also formed with two arms 52 which carry a shaft or pin 53. The shaft 53 passes through a slotted aperture 54 in one end of a cranked link 55 the other end of which is pivotally connected to the shaft 27.

In operation to clamp flange 16a to the coupling the ram 34 is initially retracted. Rams 25 are first operated to bring the clamping member 47 from an outer radial position to be axially in alignment with flange 16a. In the retracted position of ram 34 the outer end of member 43 is resting on the inner portions of camming surfaces 41. During the initial outward movement of the piston of ram 34 to the point 34a the end of member 43 moves along camming surface 47 and the whole of the movement of ram 34 is transmitted to the clamping member 47 which moves from the starting point 47a to point 47b.

This initial movement brings the clamping member 47 almost up to the flange 16a. When this point is reached the end of member 43 begins to move over the camming surface 42 and a reduction of movement is achieved which increases the pressure with which the clamping member 47 bears on flange 16a. The whole of the remainder of the movement of the piston of ram 34 from point 34a to its fully extended point 34b merely moves clamping member 47 from intermediate point 47b to the fully clamped position 47c. With such an arrangement an increase of pressure in the order of 6:1 or more can be achieved.

During this movement of cam 35 the camming surface 51 of locking cam 48 is running over surface 38 of cam 35. Should the ram 34 fail in any position during the clamping operation, cam 35 will tend to cause cam 48 to move in an anti-clockwise direction. Such action will cause caming surface 51 to act as a wedge to prevent such movement. Further the link 55 precludes such anti-clockwise movement. In addition it will be noted that this arrangement enables positive clamping of a range of thicknesses of pipe flange 16.

When it is required to disconnect the pipe the clamp is released by actuating all three rams simultaneously. The actuation of rams 25 causes shaft 27 to move quickly along the lower, horizontal portion of slot 28 so causing the cranked link 55 to move quickly to the left as shown in the drawing. This movement will jolt the locking cam 48 from its wedged position with cam 35 and allow the whole mechanism to return to the open or unclamped position.

Clamping member 47 is shown in the position for clamping sixteen inch diameter pipes and at 47d and 47e respectively this member is shown dashed at the positions for 14 and 12 inch diameter pipes, the flange 16 being that of a 12 inch diameter pipe.

Although only one clamping mechanism is shown the coupling comprises three or more such mechanisms located around member 18.

The coupling shown is particularly for use with cryogenic liquid but the coupling could be simplified for use with liquids of ambient temperatures. The coupling could be modified by replacing the two rams 25 with a single ram which could be arranged to actuate shaft 27.

With such an arrangement the actuation of the ram would be reversed.

Figure 6:
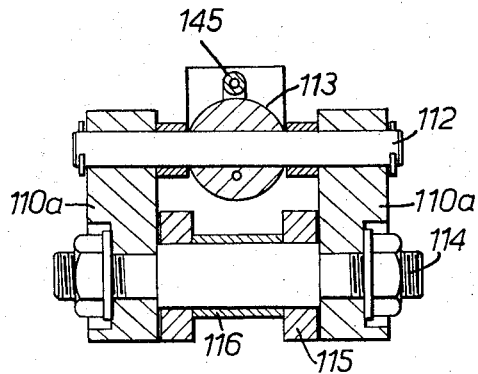
FIG. 6 is an end sectional view along the line C—C of FIG. 3.

Referring now to FIGS. 3 to 6 of the drawings, there is shown a clamping assembly suitable for use on a pipe coupling to be used on a loading arm for loading and unloading tank vessels. The assembly comprises a pair of brackets 110 formed with apertures 111 (FIG. 5) for attaching the brackets 110 to a main member (not shown) of the coupling. The brackets 110 have upstanding co-planar plate portions 110a which serve as support members for the assembly. Pivotally mounted between portions 110a on a spindle 112 is the cylinder 113 of a hydraulically actuated ram. Also pivotally mounted between portions 110a on a spindle 114 are mounting members 115 spaced apart by a spacer 116 (FIG. 6).

A pair of clamping arms 117 are pivotally mounted one on each outer face of a nose portion 115a of each of the mounting members 115 by means of a spindle 118. The clamping arms 117 pivotally mount a cam 119 between their upper ends by means of a spindle 120. The cam 119 is in the form of a bell crank with with the crank 121 pivotally mounted by a spindle 122 to the free end 123 of the piston of the hydraulic ram. The other arm of cam 119 is formed with camming surfaces 124 and 125 (FIG. 1) which are abutted by a nose portion of a member 126 which is rigidly attached to and spans mounting members 115. The arcuate camming surface 125 is serrated to assist in locking it in any position thereof with respect to member 126 so facilitating clamping of a range of thicknesses of pipe flange. The camming surface 125 and the arrangement of cam 119 is such as to provide a cam action with member 126 of less than 10°. A clamping member 127 is rigidly attached to bolts 128 between the lower ends of clamping arms 117. The clamping member 127 is the member which acts on the flange of a pipe to be coupled to the coupling in use.

A pair of first links 129 are each pivotally attached at one end to mounting member 115 at point 130 and selectively attached at the other end to one of the points 131a, 131b or 131c on mounting member 115. The first links 129 are pivotally connected between their ends, by spindles 132 to respective one ends of second links 133. The other ends of second links 133 are spanned by a spindle 134 which pivotally mounts a third link 135 and which depends at each end into a respective guide slot 136 formed in each support member 110a. The guide slot 136 is generally L-shaped and controls the radial movement of clamping arms 117 as hereinafter more fully described. The other end of third link 135 is pivotally attached between clamping arms 117 by a spindle 137 which spans such arms 117.

Figure 3:
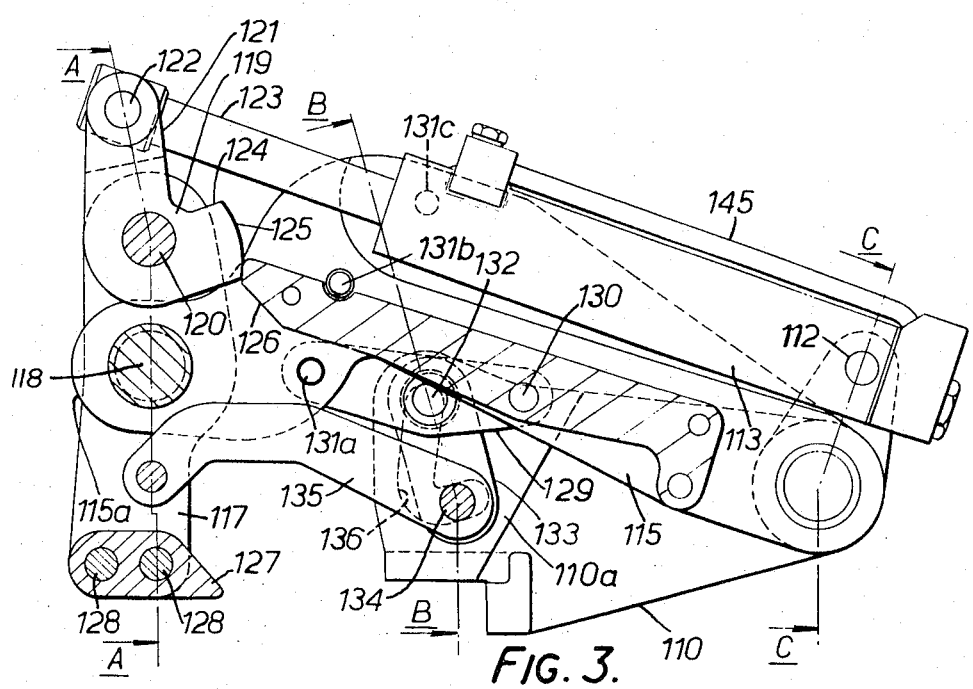
FIG. 3 is a side sectional view of a clamping assembly suitable for use as a part of a pipe coupling.

The assembly is shown in FIG. 3 in its clamped position. To release the device the hydraulic ram is actuated to draw the free end 123 of the piston towards cylinder 113. With the initial movement of end 123 cam 119 is pivoted about spindle 120 and camming surface 125 moves around the end of member 126 to move the clamping member 127 a small amount in the axial direction of the pipe being clamped. Simultaneously with this movement the movement of clamping arm 117 in a clockwise direction around spindle 118 causes movement of third link 135 and hence movement of spindle 134 in the guide slots 136 towards the bottom of the vertical portions of such slots.

With further movement of end 123 towards cylinder 113 camming surface 124 moves over the end of member 126 and hence the movement of end 123 is directly transmitted to the upper end of arms 117 so producing a substantially greater movement to the left of clamping member 127. Simultaneously with this movement, due to third link 135 and second and first links 133 and 129 the spindle 134 is caused to move up the guide slot 136, so causing radially outward movement of clamping arms 117, (upwards as shown in FIG. 3).

With the piston withdrawn in cylinder 113 the pipe is uncoupled. Should a smaller diameter pipe be required to be coupled next then the first link may be moved to be attached at point 131b or 131c to further move the clamping arms downwardly to a new starting position. To facilitate this movement the piston and cylinder 113 are made longer than required for any one of the positions 131a, 131b or 131c with a different portion of the stroke of the ram being used for these different positions.

The action is the reverse of that described above with guide slots 136 controlling the radial movement of arms 117 and cam 119 allowing an initial large movement and then a reduced movement with consequent increased pressure for the final movement of the ram and allowing different thickness flanges to be clamped positively.

To provide a pipe coupling three or more assemblies as illustrated are positioned equidistantly around a coupling flange to which the flange of a pipe is to be coupled.

Figure 3A:
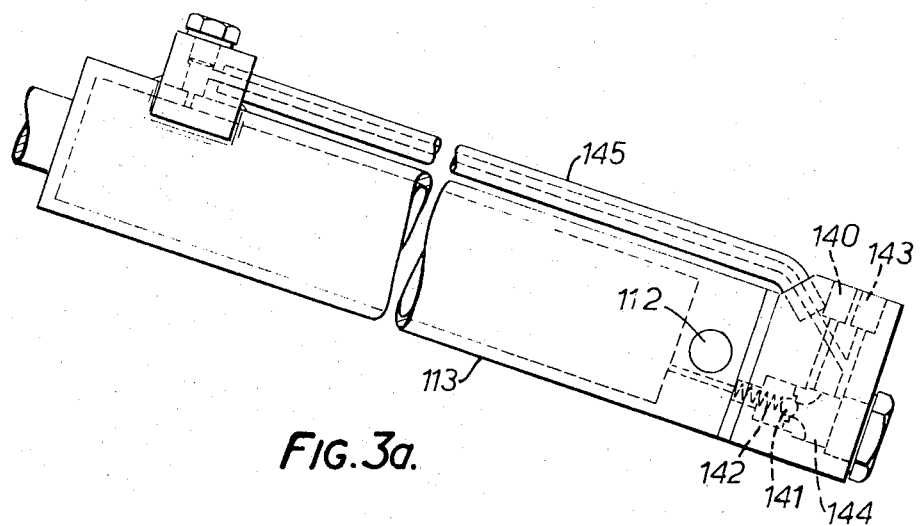
FIG. 3a is a side elevational view of a part of FIG. 3 on enlarged scale.
Figure 4:
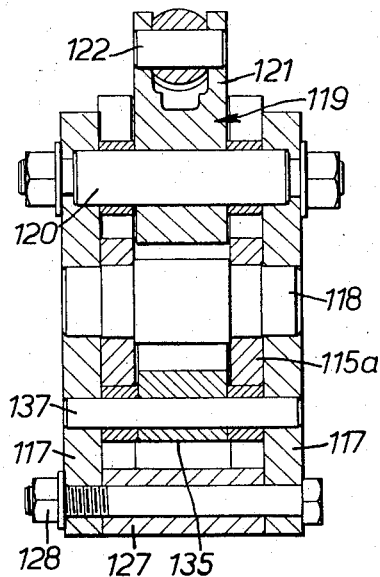
FIG. 4 is an end sectional view along the line A—A of FIG. 3.
Figure 5:
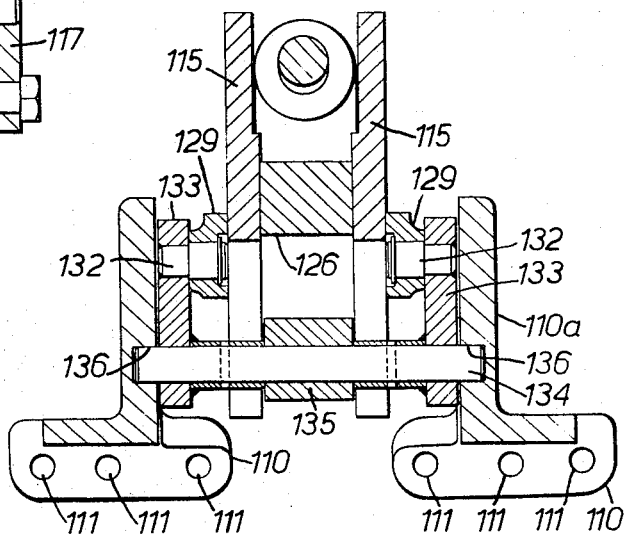
FIG. 5 is an end sectional view along the line B—B of FIG. 3.

Hydraulic pressure to actuate the ram for clamping is applied to inlet 140 (FIG. 3a) which moves check valve ball 141 against a bias spring 142. Should there be a hydraulic failure the check valve ensures that the ram retains its position. Hydraulic pressure for unclamping is applied to inlet 143, this actuates plunger 144 to release check valve ball 141 and allow release of pressure from the cylinder 113 and also applies pressure to the other side of the piston of the ram via conduit 145.

The clamping assembly of FIGS. 3 and 6 may be used with pipes carrying cryogenic liquid and in this case can be adapted in a number of ways. Firstly the clamping assemblies to make up a pipe coupling may be mounted as illustrated in FIG. 1. Alternatively the brackets 110 may be made of a synthetic plastics laminate such as paper, cotton or glass fibre base material with a phenolic or epoxide resin. In a further alternative a polytetrafluoroethylene member may be located between brackets 110 and the main mounting body or flange.

In both embodiments the clamping member 47 or 127 may be fabricated of the above described synthetic plastics laminate.

I claim:

1. A clamping assembly for a pipe coupling arranged so as to be movable both axially and radially of said pipe coupling for releasably engaging and clamping a flange of a pipe member to said pipe coupling, said clamping assembly including:

a clamping arm;

means mounting said clamping arm for both axial and radial movement with respect to said pipe coupling;

fluid actuated ram means controlling the movement of said clamping arm such that extension and retraction, respectively, of said ram means moves said clamping arm into and out of a clamping position;

locking cam means mounted for movement in response to said movement of said clamping arm so as to mechanically lock said clamping arm when in said clamping position in the event of failure of said fluid actuated ram means; and means for initially directly transmitting said extension movement of said ram means to said clamping arm, resulting in a relatively large movement of said clamping arm toward said clamping position, and thereafter transmitting continued extension movement of said ram means to said clamping arm through said locking cam means, resulting in a relatively small final movement of said clamping arm into said clamping position and increase of pressure thereto.

2. A clamping assembly as claimed in claim 1, wherein said clamping arm is pivotally mounted to a mounting member which is in turn pivotally mounted to a fixed support member;

said fluid actuated ram means is pivotally mounted at one end to said fixed support member, and including linkage means between said clamping arm and said mounting member controlling said radial movement of said clamping arm.

3. A clamping assembly as claimed in claim 2 wherein said linkage means includes a first link member which is pivotally mounted at one end to said mounting member and is fixedly locatable, at its other end, at any one of a plurality of positions on said mounting member, whereby the radial starting position of said clamping arm is adjustable.

4. A clamping assembly as claimed in claim 3 wherein said fluid actuated ram means includes a ram member that is longer than required to achieve the desired clamping operation with said first link in any of said plurality of positions.

5. A clamping assembly as claimed in claim 3 wherein said linkage means includes second and third link members, said second link member being pivotally mounted at one end to a point intermediate the ends of said first link member and pivotally mounted at its other end to one end of said link third link member, said third link member being pivotally mounted at its other end to said clamping arm at a point intermediate the pivotal mounting of said clamping arm to said mounting member and the clamping end of said clamping arm, said pivotal mounting between said second and third links comprising a spindle member which extends into a guide slot formed in said fixed support member, and said guide slot controlling said radial movement of said clamping arm through said spindle member.

6. A clamping assembly as claimed in claim 5 wherein said clamping arm, said mounting member, said fixed support member, and said first and second link members all comprise pairs of members arranged symmetrically one on each side of said fluid actuated ram means, said locking cam means and said third link member.

7. A clamping assembly as claimed in claim 6 wherein said locking cam means comprises a first cam member shaped in the form of a bell crank level pivotally mounted between said clamping arms, the crank portion of said bell crank lever being pivotally mounted to the outer end of said ram member of said fluid actuated ram means, said bell crank lever further being formed with an arcuate camming surface at the end thereof opposite to its pivotal mount; and including a rigid arm member affixed to and extending between said pivotal mounting member, said rigid arm member terminating at its free end in a nose portion, said camming surface of said locking cam means adapted to abut said nose portion of said rigid arm member when said clamping arm is in said clamping position to thereby mechanically lock said clamping arm in said clamping position.

8. A clamping assembly as claimed in claim 7 wherein said arcuate camming surface is serrated.

9. A clamping assembly as claimed in claim 7 wherein said locking cam means is so formed and so mounted that there is provided an action of said arcuate camming surface with a cam angle of less than 10°.

10. A clamping assembly as claimed in claim 1 wherein the fluid actuated ram means includes a fluid actuated check valve.

11. A clamping assembly as claimed in claim 7, wherein said locking cam means includes a second cam member engageable with said first cam member adapted to lock said first cam member in any position thereof during actuation of the assembly for clamping.

12. A clamping assembly as claimed in claim 1, wherein said fluid actuated ram means comprises a pair of fluid actuated ram members, one of said ram members being actuated prior to the other ram member for independently controlling said radial movement of said clamping arm toward said clamping position.

13. A clamping assembly as claimed in claim 12 wherein said pair of fluid actuated ram members are adapted to be actuated simultaneously for release of said clamping arm from said clamping position; and including means connecting said ram members to said second cam member adapted to release said second cam member from locking engagement with said first cam member.

14. A pipe coupling including three or more clamping assemblies as claimed in claim 1 mounted on a tubular outer member which surrounds and is spaced apart from an inner tubular member providing the liquid passage of the coupling and a heat insulating medium being located in the space between said tubular members.

15. A pipe coupling as claimed in claim 14 wherein the outer tubular member is rigidly attached to the inner tubular member at its end adjacent the flange engaging end of the coupling and radially supported but axially free for expansion and contraction at its other end.

16. A pipe coupling as claimed in claim 15 wherein the radial support for said other end of the outer tubular member comprises an annular member which spans the space between the tubular members.

17. A pipe coupling as claimed in claim 16 wherein said annular member comprises polytetrafluoroethylene.

18. A pipe coupling as claimed in claim 16, wherein said heat insulating medium comprises expanded polystyrene.

* * * * *